Patented Aug. 6, 1935

2,010,517

UNITED STATES PATENT OFFICE 2,010,517

COATED TRANSPARENT SHEETS OF CASEINATES

Russell L. Jenkins, Anniston, Ala., assignor to Swann Research, Incorporated, a corporation of Alabama No Drawing. Application April 7, 1933, Serial No. 664,940

5 Claims. (Cl. 91—68)

This invention relates to a coated transparent sheet material comprising a casein plastic and to a process for producing same.

One object of this invention is the provision of a coated transparent sheet of a casein plastic, which sheet shall be capable of use as a transparent water- and moisture-resistant wrapping material. A further object is the provision of a transparent casein derivative sheet of casein plastic material which shall have from 20 to 200 times the moisture resistance of an uncoated sheet of casein plastic material. Further advantages of my improved product will become apparent as the disclosure proceeds.

Transparent moistureproof sheets such as herein disclosed are in considerable demand for wrapping food products such as bread, pastry, cereals, candy, tobacco, butter and allied products where it is desired to maintain the moisture content thereof at a substantially constant value. While coated transparent sheets of casein plastic material have been produced in the past, they have not possessed the moisture- or water-resistance which my improved product possesses.

I have now discovered that certain halogenated, particularly diphenyl or polyphenyl, resins—also referred to as halogenated diaryl resins—may be combined with waxes or waxy substances, with or without the addition of plasticizers, and such resinous mixture then coated on transparent sheets of casein plastic materials and improved moisture-resistance obtained, thus forming a unitary structure incapable of separation.

The casein plastic materials here contemplated are commonly made by casting a colloidal solution comprising sodium caseinate into a thin film which is subsequently hardened by contact with formaldehyde and which may be plasticized during manufacture with glycerine or other plasticizers in known manner. Such plastic materials exhibit little resistance to the passage of water vapor and are quickly destroyed on contact with liquid water.

A further difficulty with such material is the tendency to become brittle due to drying out of the moisture from the film. I have discovered that my treatment will yield a transparent sheet of casein plastic which will retain its flexibility and strength, even though exposed to air of a low relative humidity.

The transparent casein plastic sheets which I prefer to treat may either be the plain uncoated sheet or a sheet which has previously been coated by a separate process. For some purposes I prefer to first coat such sheet with a cellulosic lacquer and then to coat with the waxy compositions herein disclosed. By thus double coating a casein sheet, I am able to materially increase the moisture- and especially the water-resistance of the sheet.

The new effect which is exhibited by mixtures of chlorinated diphenyl resins and waxes, I believe to be the result of the peculiar compatibility of the wax in this particular resin or resin mixtures containing the same. This unusual type of compatibility is characterized by a slowly changing solubility limit over a period of time and manifests itself by the increased opacity of the coating composition when in bulk form, particularly by those mixtures having as little as 2 to 4 percent of paraffin wax dissolved in the resin. It is possible to control the changing solubility of the wax in the coating mixtures and prevent blushing by a method which I have disclosed in detail elsewhere and which is also given here. By such control means I am able to prevent the opacity caused by the wax separation from the coating composition in bulk from becoming an objectionable blush when such compositions are coated on transparent sheets.

Casein plastic sheets, being essentially colloidal in nature and containing a certain proportion of water in such colloidal structure, are sensitive to high temperatures, that is to temperature above 60° C., especially when the exposure to such temperature is too long continued. In order to avoid any undue weakening of the casein sheet, I therefore prefer to effect the coating operation by means of a solution of the resin-wax mixtures in an appropriate solvent. It is by no means a matter of no concern as to what solvent or solvent mixture is employed. I have found that particularly favorable results are obtained by the use of what I term high-boiling solvents. This term I use in the same sense in which it is employed in the lacquer industry. Examples of such solvents are toluene and butyl acetate.

The casein plastic sheets are coated continuously in a machine, the sheet being supplied to one end of the machine in a continuous manner, and then while in the machine are coated with the resin-wax mixture.

The resin-wax mixture which I prefer to use is a combination of chlorinated polyphenyls, among which the chlorinated diphenyls comprise an important part. The resins to be mixed with the chlorinated polyphenyls may comprise any of the known resins which may be either of natural or synthetic origin, or a mixture of resins may be employed.

Where especially high moistureproofness is desired, I find that ester gum forms a desirable ingredient of the resin-wax combination. An example of the preferred resin-wax combination suitable for coating on casein plastic sheets may be the following in parts by weight:—

Chlorinated diphenyl resin _____ 39.0
  (see Examples V and VI of U. S. Patent 1,892,400)
Ester gum _____ 45.0
Hard paraffin _____ 8.0
Mineral oil (liquid petrolatum) _____ 8.0

This mixture may, for convenience in handling, be melted together to form a homogeneous mass; or the individual ingredients may be directly dissolved in the high-boiling solvent.

For application on casein plastic sheets, I have obtained good results by employing a 40% to 50% solution of the resin-wax mixture in toluol in which all the ingredients are soluble. The solution used for coating may be employed cold, that is, at room temperature, or it may be applied slightly warm.

After the sheet has passed through the resin-wax coating bath, it is passed between doctor-knives or rolls, in order to remove the excess of coating composition. It is then subjected to a current of warm air to assist in the evaporation of the solvent. Moderate air temperatures are desirable. I have found that temperatures ranging from 62° to 57° C. are practical.

In order to prevent a wax-blush from forming on the surface of the coated sheet and thus destroying the transparency, I now treat the coated sheet, from which the solvent has been evaporated, according to an additional operation which I have described and claimed elsewhere. For the sake of completeness, it is given in detail here.

The sheet which has been running continuously through the coating bath, the solvent evaporation chamber, and then into the air of the room will be found to develop a blush, distinctly visible to the eye as the sheet approaches room temperature. The point where the blush develops is in general dependent upon the proportion of wax in the coating composition. Where 8% of wax is present, as in the present case, the blush will develop in from 35 to 40 seconds after the solvent has evaporated from the paper. Where larger amounts of wax are present, the blush will develop more rapidly; while with smaller amounts of wax, less rapidly than the above figures.

In any case, I observe the moving sheet to locate the blush point and then, having visually located the point of blush formation, I insert a cooling operation which shall be effective to rapidly cool the moving sheet to a lower temperature. The cooling operation is placed at a point before the visible blush occurs on the sheet.

The temperature to which the sheet is cooled in order to prevent blushing may for the present purpose be fixed at from 10° to 20° C., or even lower. Practically the sheet may be drawn through cold water, the time of contact being only of sufficient duration to chill the sheet. Because of the water-resistant nature of the coating composition, no harm is done to the casein sheet by contact with the water.

After adhering droplets of water are removed, the sheet is wound on a roll and is ready for use. It will be appreciated, of course, that other methods such as exposure to cold air, contact with a cold roll, etc., may be employed in place of the cold water bath above described.

The above procedure is effective for the production of a highly moisture-resistant transparent casein plastic sheet. In order to further increase the resistance of the sheet to liquid water, I have found it desirable to first coat the sheet with a coating composition of the lacquer type.

A suitable coating composition for initially coating casein plastic sheets may be composed of a nitrocellulose base, a resin and a plasticizer, all of which are dissolved in a volatile solvent. The following formula is recommended because of the high degree of water- and moistureproofness and flexibility imparted to the finished sheet:—

Parts by weight
Non-volatile { ½-second nitrocellulose _____ 51.3
  chlorinated diphenyl resin, 56°–82° C. S. P. _____ 30.0
  dibutyl phthalate _____ 18.7

Parts by volume
Volatile { ethyl alcohol (formula 3A) _____ 11.7
  butyl acetate _____ 40.2
  toluol _____ 48.1

The compounded lacquer preferably contains in the neighborhood of 15% of non-volatile constituents.

Application of the lacquer is carried out in a manner quite similar to that described above for the resin-wax compositions. After the solvent has been evaporated and the coating is substantially dry and tack-free, it may then be coated with the resin-wax composition and in the manner described above.

The use of chlorinated diphenyl resins both for formulating the resin-wax composition and also the lacquer-type compositions is especially desirable, because of the enhanced water- and moisture-proof qualities imparted to the coated casein sheet. Specifically the moistureproof properties will show an improvement of from 20 to 200 or more times that of the uncoated casein sheet. It is furthermore substantially unaffected by contact with liquid water and maintains its flexibility and strength after exposure even to adverse humidity conditions.

As far as I am aware, the incorporation of halogenated resins, particularly chlorinated diphenyl or polyphenyl resins, in the resin-wax or lacquer-type coating compositions develops a combination of valuable properties on the object coated therewith, which is not obtained by any other combination of resins. Such properties as good transparency, gloss, adhesion to the casein plastic surface, flexibility, moisture- and water-proofness beyond that possessed by coated or uncoated casein sheet materials are directly attributable to the presence of the chlorinated polyphenyl resins herein employed.

While I have disclosed my invention in specific terms, it will be appreciated by those skilled in the art that it is not so limited, but is susceptible of various changes and modifications without departing from the spirit thereof; and I desire therefore that it shall not be limited except as indicated by the prior art, or as set out in the appended claims.

What I claim is:—

1. An article of manufacture comprising a unitary transparent sheet or film of casein plastic material having a primary adherent coating comprising nitrocellulose, a chlorinated diphenyl resin, and a plasticizer adjacent said film and a secondary coating comprising a chlorinated diphenyl resin and a wax.

2. An article of manufacture comprising a unitary transparent sheet or film of casein plastic material having a primary adherent coating comprising nitrocellulose, a chlorinated diphenyl resin, and a plasticizer adjacent said film and a secondary coating comprising a chlorinated diphenyl resin and a wax, said article exhibiting water- and moistureproof properties.

3. An article of manufacture comprising a unitary transparent sheet or film of casein plastic material having a primary adherent coating comprising nitrocellulose 51.3 parts, chlorinated diphenyl resin of 56–82° S. P. 30.0 parts, dibutyl phthalate 18.7 parts, and a secondary coating comprising a chlorinated diphenyl resin and a wax.

4. An article of manufacture comprising a unitary transparent sheet or film of casein plastic material having a primary adherent coating comprising nitrocellulose, a chlorinated diphenyl resin, and dibutyl phthalate, and a secondary coating comprising a chlorinated diphenyl resin 39.0 parts, ester gum 45.0 parts, hard paraffin 8.0 parts, and mineral oil 8.0 parts.

5. An article of manufacture comprising a unitary transparent sheet or film of casein plastic material having a primary adherent coating comprising nitrocellulose 51.3 parts, chlorinated diphenyl resin 30.0 parts and dibutyl phthalate 18.7 parts, and a secondary coating comprising a chlorinated diphenyl 39.0 parts, ester gum 45.0 parts, hard paraffin 8.0 parts, and mineral oil 8.0 parts.

RUSSELL L. JENKINS.